United States Patent [19]

Rudolph et al.

[11] Patent Number: 4,763,320
[45] Date of Patent: Aug. 9, 1988

[54] METHOD AND ARRANGEMENT FOR TRANSMITTING DATA, ESPECIALLY IN AN AIRCRAFT

[75] Inventors: Ralph Rudolph; Werner Weiler, both of Hamburg, Fed. Rep. of Germany

[73] Assignee: Messerschmitt-Bölkow-Blohm GmbH, Bremen, Fed. Rep. of Germany

[21] Appl. No.: 745,315

[22] Filed: Jun. 14, 1985

[30] Foreign Application Priority Data

Jul. 6, 1984 [DE] Fed. Rep. of Germany ....... 3424866

[51] Int. Cl.⁴ .............................................. H04J 3/16
[52] U.S. Cl. ........................................ 370/85; 370/95
[58] Field of Search ....................... 370/85, 86, 89, 90, 370/95, 96, 104, 87

[56] References Cited

U.S. PATENT DOCUMENTS

| | | | |
|---|---|---|---|
| 3,723,971 | 3/1973 | Betts et al. | 370/90 |
| 3,824,545 | 7/1974 | Brenner et al. | 370/90 |
| 4,034,351 | 7/1977 | Takezoe | 370/90 |
| 4,413,338 | 11/1983 | Renoulin et al. | 370/89 |
| 4,423,507 | 12/1983 | Roger et al. | 370/89 |
| 4,603,418 | 7/1986 | Townsend | 370/95 |
| 4,680,753 | 7/1987 | Fulton et al. | 370/89 |

Primary Examiner—Douglas W. Olms
Attorney, Agent, or Firm—Becker & Becker, Inc.

[57] ABSTRACT

A method and arrangement for the transmission of data, in digital form, in a bus system, which includes a central unit, several stations, as well as a bus line or data bus. During operation, the following different transmission phases take place: An initiation phase, in which the central control unit queries all of the stations and prepares a request phase; the request phase, in which the individual stations report a required bus access; an allocation phase, in which each station obtains a time slot in response to its request; and a data phase, for transmission of the data. The central unit includes a phase control, a request collector, a time slot allocator, and a register. A number of the stations are provided with a request generator in such a way that the latter can signal a need to the bus access. Thus, an optimum utilization of the transmission capacity is achieved, possibly by switching stations off. However, a rapid bus access is possible at any time for important stations.

6 Claims, 3 Drawing Sheets

METHOD AND ARRANGEMENT FOR TRANSMITTING DATA, ESPECIALLY IN AN AIRCRAFT

BACKGROUND OF THE INVENTION

1. Field of the Invention

The present invention relates to a method and arrangement for time-division multiplex transmission of data, in digital form, in a bus system, with varying signals, such as digitalized analog signals, stochastically or randomly occurring switching signals, etc., being possible; the bus system comprises a central control unit, several equivalent participating or subscribing stations which are subordinate to the central control unit, and at least one bus line or data bus, which connects all of the subscribers.

2. Description of the Prior Art

With time-division multiplex transmission of digital communication or information signals via a common data transmission medium, there is a fixed agreement via the allocation of the transmission times (time slots). Different methods are known for trying to resolve the problem of regulating the bus access; these methods are divided into centralized and decentralized approaches. The centralized approaches operate with an overriding control unit, which respectively assures bus access to a bus subscriber. With the decentralized methods, a process which takes place within a given subscriber ensures that only one subscriber at a time can engage the bus. The decentralized methods have the advantage that they require no central control unit. For this reason, however, it takes a relatively long period of time until a subscriber can obtain bus access. Under certain circumstances the method jams itself, for example the so-called CSMA/CD method (CSMA/CD=Carrier Sense multiple Access with Collision Detect). Some methods are rather problematical for subscribers of different signal classes, and when a subscriber fails (token-passing method, but also CSMA/CD methods).

The centralized methods have the advantage of being able to monitor and control the subscriber in a very precise and comprehensive manner. However, they load the transmission medium by additional data exchange for organization purposes.

German Patent No. 22 62 933 Hilderbrand et al dated Jan. 7, 1982 discloses a method of time slot allocation which can be used both centrally and decentrally. In this method, no rigid limits exist in the transmission capacity which is available for the individual signal classes. Instead, a flexible adaptation to the traffic is effected, with the possibility of totally utilizing the system capacity. Therefore, with this system, to transmit different types of information signals in a time-division multiplex transmission system, where the time multiplex frames are divided into m subframes, and each subframe is divided into n time slots, there is provided that this loading of the time multiplex frame be effected by signals in such a way that initially in each case the $i^{th}$ time slot of the subframe is loaded, and only after all of the subframes of a time multiplex frame of the $i^{th}$ time slot are occupied, is an adjacent time slot of the subframe additionally loaded.

However, the drawback to this heretofore known method is that when the system capacity is fully utilized, access to the transmission medium for data transmissions which become additionally required is blocked.

An object of the present invention accordingly is to provide a method and arrangement of the aforementioned general type which optimally controls the bus access while taking into consideration the available bandwidth, which during overload does not block the data traffic, which permits rapid access to the transmission medium and which is flexible with regard to the choice of transmission medium as well as in the design of the bus system.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
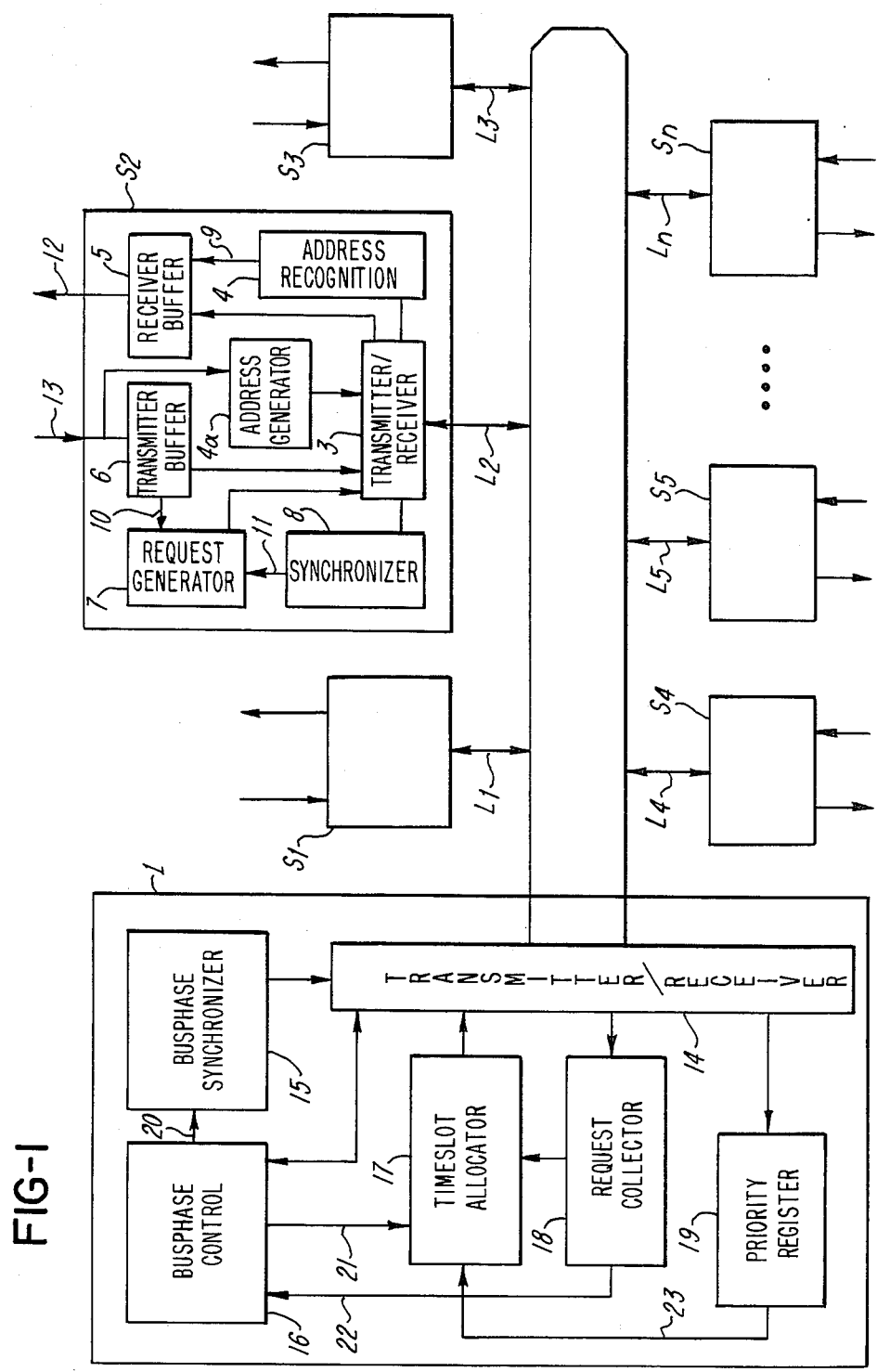
FIG. 1 is a view of a block diagram that shows one exemplary arrangement of the inventive data bus system.

The method and arrangement of the present invention are characterized primarily in that so-called request phases are introduced into the data traffic from the central unit at specific time intervals; in these request phases, the individual stations report a required bus access, and the central unit thereupon allocates a specific time slot to each station in a subsequent so-called allocation phase due to the input request, with this time slot being used until the next request phase. In this way, there exists the possibility of assigning an appropriate priority to certain important stations right from the beginning. This assures that in each case these stations are among the first to obtain a bus allocation within an allocation phase.

The advantage of the present invention is that the method of transmission is independent of the choice of the medium (light-wave conductor, coaxial line, or two-wire cable), it permits very different bus designs (ring structure, line structure, and placement and number of subscribers), and thereby offers the transmission reliability required in an aircraft.

Pursuant to further advantageous embodiments of the present invention, with a linear bus line, the control unit can control a second equivalent bus system based on the same method; when the first bus system fails, the second bus system takes over the function of the first system. In each data phase, there may be provided for the signalling of bus requests a time slot in which at least one privileged station can emit a request pulse which causes the central control unit, after completion of this data phase, to carry out an immediate request query and to assure that the requesting station obtains a time slot in the new bus allocation. It is also possible to have the control unit automatically carry out initiation phases during greater time intervals in order to determine the status of the bus system, as well as failed stations or newly added stations.

The advantage of the inventive method, and of the arrangement for carrying out this method, is that the allocation of time slots to the subscribers takes place for a limited duration; furthermore, the bus system is only slightly loaded at periodic intervals with organizational data traffic.

The customarily limited bus capacity is offered to the subscribers in conformity with the production of data, and can even be withdrawn, thus freeing the capacity for other subscribers. In the event of excess load, the bus capacity can be made available for selected subscribers, while other subscribers are served less often, although they are not completely cut off from the data traffic.

Due to the possibility of addressing each subscriber, there results a simple modular design of a bus system having possibilities for simple modification, even during operation.

The provision of suitable algorithms in the central control unit permits an adaptation of the channel allocation to the respective traffic requirement.

DESCRIPTION OF PREFERRED EMBODIMENT

Referring now to the drawings in detail, FIG. 1 shows a basic circuit diagram of a system for transmitting data. A central unit 1 is connected via a data bus 2 and coupling lines L1 to Ln with a number of subscribers, which are here designated as the stations S1 to Sn, and in principle all have the same internal circuitry. This circuitry is illustrated in greater detail with the aid of the station S2. The line L2 is connected with a transmitter/receiver 3, which in turn is operatively connected with an address recognition 4, an address generator 4a, a receiver buffer 5, a transmitter buffer 6, a request generator 7, and a synchronizer 8. Respective direct connections 9, 10, and 11 are provided between the address recognition 4 and the receiver buffer 5, between the transmitter buffer 6 and the request generator 7, and between this generator 7 and the synchronizer 8.

The data exchange between the station S2 and a non-illustrated peripheral unit is effected via the lines 12 and 13, with the latter being connected with the address generator 4a, which is connected with the transmitter/receiver 3. The internal circuitry of the central unit 1 comprises a transmitter/receiver 14, with which is connected a bus phase synchronizer 15, a bus phase control 16, a time slot allocator 17, a time slot request collector 18, and a priority register 19. Respective direct connections 20, 21, 22, and 23 are provided between the synchronizer 15 and the control 16, the control 16 and the allocator 17, the control 16 and the collector 18, and between the allocator 17 and the register 19. The register 19 contains a list of all of the stations S1 to Sn, which correspond or communicate with one another via the unit 1; this list can easily be altered by deleting data or by inputing new data. The data pertaining to the individual stations S1 to Sn includes the respective unique addresses, as well as a code which determines the respective priority. The data stream forms individual blocks, the so-called bus phases, on the bus. In the intended normal operation, three bus phases occur, namely a request phase, an assignment or allocation phase, and a data phase. To control these phases, at the beginning of a phase the synchronizer 15 emits an appropriate signal (SYNC) in the form of a bit pattern, which clearly defines the following phase and furthermore serves to synchronize the counting or metering processes which occur in the individual stations. At the start of the data phase, the bus phase synchronizer 15 emits a signal DATA-SYNC via the transmitter/receiver 14, as a result of which a time meter is started in each of the stations S1 to Sn. Once in a given station an individual waiting time or delay TTSD (time to start data transmission), which has been supplied from the control unit, has expired, this station begins to emit within its time slot. The emitted data block includes an address field and a data field. In addition to the objective address, the address field can also contain other information for the addressee, for example source address, data type, etc. After all of the stations have emitted within their time slots, an interruption or pause occurs until the central unit 1 initiates a new phase by emitting the respective synchronizing signal.

During a prescribed duration of the data phase, the number of stations which can emit within this time period is a function of the bandwidth of the transmission medium, with the result that a natural limitation is set for the capacity of the system. If a large number of subscribers exists, the transmission capacity is not sufficient for all of them, so that the subscribers are switched on and off by the bus. For this purpose, the bus phase control 16 is provided within the central unit 1; after the completion of a sufficient number of data phases, the bus phase control 16 initiates a request at regular intervals. In response thereto, the central unit 1 emits to all of the stations S1 to Sn a synchronizing signal (REQ-SYNC) for the request phase. In this situation also, each station has a time slot as well as a TTSR (time to start request), which are of such a length that all of the stations have a turn within the request phase. In so doing, each station emits a bus request in the form of a bit pattern formulated essentially by the respective request generator 7.

A bus request comprises the inforration of the actual address, and a URQ-command (URQ=user request), which can also contain the information that no request exists. If after completion of the request phase all of the requestsare on hand, an allocation phase is initiated by a signal (ALL-SYNC), which is effected by the bus phase control 16. During this phase, all of the stations are switched to reception and receive their new TTSD, which is determined by the time slot allocator 17. For administrative purposes, the register 19 stores the information as to which station has received what time slot.

A plurality of data phases then again follow an allocation phase; these data phases progress to the individual stations pursuant to the new distribution of the time slots. If the central unit 1 requires a longer processing or computing time, data phases can also be interposed between a request phase and the pertaining allocation phase.

If, for example due to an expansion of the system, more requests are received than time slots are available, the central unit 1, pursuant to an appropriate algorithm, provides a selection of stations, which have a given time slot. During the next cycle, the rejected stations are taken care of. In this manner, a limited number of time slots can be distributed over a larger number of stations, although for any given station S, this can mean a limitation of the transmission or emitting time which is available. In order for this type of data transmission to even be able to take place, the time slots for the request phase must be initially determined. For this purpose, each station S is instructed by the central unit 1 to report or signal, so that in the register 19 a list can be formed of all stations for which time slots need to be available. Each station which signals is allocated a TTSR in an initial allocation phase. This phase is initiated by a synchronization signal IA-SYNC. This signal differs from the signal ALL-SYNC in that it effects the allocation of a TTSR. In this way, each station later has two time slots to take into consideration, namely:

One in the data phase, which is characterized by the TTSD, is used for the data transmission, and can be altered by the central unit or even entirely removed, and One which is characterized by the TTSR, is used in each request phase for transmitting a bus request, and is available from the central unit 1 only once respectively at the beginning of the operation in the initiating phase.

If important data is present at a given station, but this station was not considered during the last allocation of data slots, it is excluded from further data traffic until the next request phase.

Accordingly, pursuant to a further embodiment of the inventive arrangement, which is not illustrated, the transmitter/receiver 3 of each station has a switching circuit for directly forcing a request phase. In conformity therewith, the transmitter/receiver 14 of the central unit 1 has a switching circuit which recognizes such a signal, for example a simple pulse, and causes the phase control 16 to initiate a request phase as the next phase. In this connection, it is not important for the further progress which station, or possibly how many stations, emit this signal. The only important thing is that in the request phase each station which has induced this phase or been affected thereby is recognizable as such. Thereupon, each of these stations is automatically allocated a time slot in the following allocation phase, whereas other stations, especially those which have placed no request, remain without bus access. In order to transmit the activating signals for a request phase induced by a privileged station, with this embodiment a request slot is provided within each data phase. The recognition of an activating signal is effected, for example, due to the fact that a corresponding pulse appears in this request slot.

Figure 2:
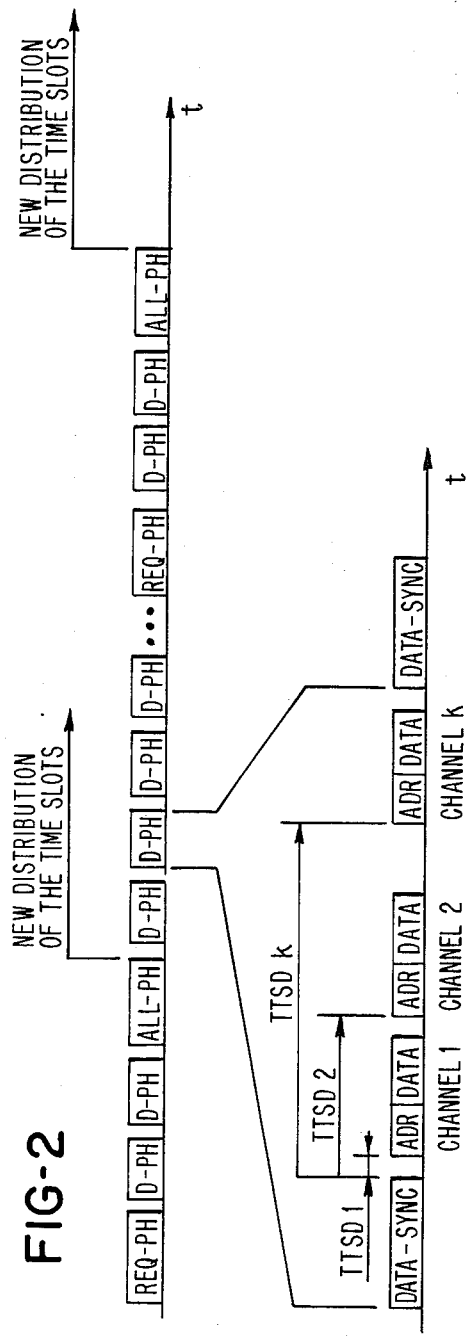
FIG. 2 is a view of a block diagram that shows the chronological sequence of a data transmission to the bus.

FIG. 2 shows the chronological progress of the data stream which passes one station connected to the bus system. On the upper time axis of FIG. 2, the data traffic begins with a request phase, followed by two data phases and an allocation phase, in which the new distribution of the time slots, which results from the request phase, is communicated to the individual stations. The subsequent data phases are effected in conformity with the indicated new distribution until a second request phase REQ is effected, which can then effect a further new distribution, which is communicated to a second allocation phase ALL, etc. An expanded data phase is illustrated on the lower time axis of FIG. 2. This phase is initiated by the signal DATA-SYNC, whereupon each of the k subscribers, after completion of its specific TTSD 1, etc., emits the address which is to be responded to, and emits the data which is to be transmitted. The individual time slots are designated channel 1, channel 2, etc., up to channel k, where k can be less than the total number n of connected stations.

Figure 3:
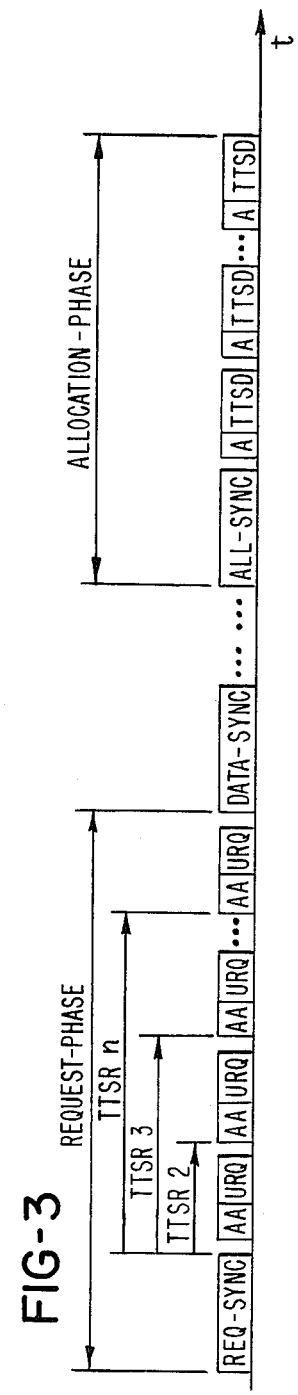
FIG. 3 is a view of a block diagram that shows the operation of a new distribution of time slots.

FIG. 3 shows the cycle of a new distribution of time slots having a request phase in which all n stations identify their own or actual addresses AA, and then emit their URQ signals. This phase is initiated by a REQ-SYNC, whereupon the individual TTSR are started. The subsequent DATA-SYNC initiates a data phase.

When the central unit 1 has determined the new TTSD, the latter are communicated to the individual stations in the subsequent allocation phase.

Figure 4:
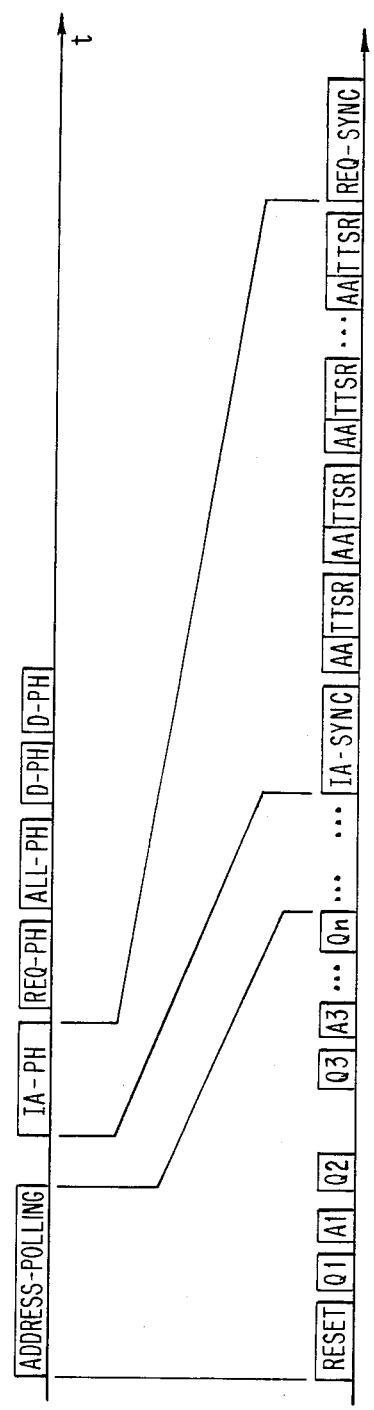
FIG. 4 is a view of a block diagram that shows an initiation of the bus system.

FIG. 4 shows the chronological progress of the data traffic during an initiation phase, which is to be carried out prior to proceeding with the normal operation. This phase has new stages, which are characterized by the processes which take place therein, namely: Address-polling, first allocation of request slots, first request of data slots, and first allocation of data slots. The lower time axis is again expanded, thus showing the details of the address-polling. Here, after a RESET signal, all of the stations are successively addressed by queries Q1 to Qn. A respective interval is provided between the individual query blocks for the pertaining answers A1 to An. Also shown on this expanded time axis are the details of the first allocation stage, which is initiated by a signal IA-SYNC. In this stage, the stations which reported or signaled during address-polling are allocated request slots by communication of the respective TTSR, with the address A1, etc. of the respective station appearing first in the respective data block.

Figure 5:
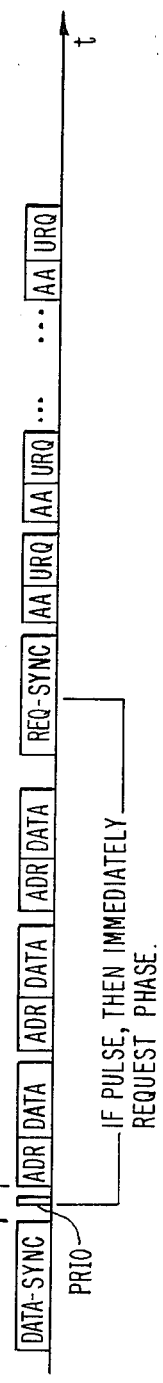
FIG. 5 is a view of a block diagram that shows a data phase with a priority request signal.

FIG. 5 shows a data phase having a priority request signal PRIO. Since this signal appears within the request slot RS, it is understood by the central unit 1 as the signal for inducing a request phase. Directly thereafter, i.e. after interruption of the functioning data phase, the induced request phase is initiated by a REQ-SYNC emanating from the central unit 1. In this phase, the individual stations emit their requests URQ, and the station which induced the request phase makes itself recognizable. In the following allocation phase, this station is then automatically allocated a data slot.

The present invention is, of course, in no way restricted by the specific disclosure of the specification and drawings, but also encompasses any modifications within the scope of the appended claims.

What we claim is:

1. A method for time-division multiplex transmission of data, in digital form, in a serial data bus system, with varying signals being possible; the bus system includes a central unit, several equivalent subscribing stations which are provided with individual addresses and which are subordinate to said central unit, and at least one bus line or data bus, which connects all of said stations, whereby time slots are alloted or taken away from the stations by said central unit in a predetermined manner and data transmission transpires in different phases subject to employment of normal request techniques; said method comprises the steps of carrying out the following transmission phases:

undergoing an initiation phase, in which said central unit accordingly determines and acertains number of said stations participating and accordingly allocates to each ascertained station a fixed predetermined time slot for the request phase as to said stations participating;

proceeding with said request phase, in which the individual stations request a time slot from said central unit for purposes of a required bus access, with each station then accordingly having its predetermined fixed time slot;

continuing in an allocation phase, in which said central unit allocates to each of said stations a time slot in response to request therefor;

obtaining a data phase, in which the data is transmitted; and providing, in each of said data phases, for the signalling of bus requests, a time slot in which at least one preferred station can emit a request pulse which causes said central unit, after completion of this data phase, to go on proceeding to carry out immediately thereafter the request phase and assuring that the requesting station receives a time slot in the new bus allocation.

2. A method according to claim 1 which includes the steps of operating two equivalent bus systems, and linear bus lines, with said central unit handling both of said bus systems pursuant to said steps of carrying out the transmission phases; and employing the second bus system to assume the functions of the first bus system when the latter fails.

3. A method according to claim 1, which includes the step of causing said central unit to automatically carry out initiation phases at greater time intervals in order to determine the status of said bus stations, as well as also to determine whether stations have fallen out of action or new stations have been added.

4. An arrangement for time-division multiplex transmission of data in digital form, with varying signals being possible; said arrangement having a serial data bus system that includes a central unit, several equivalent stations which are provided with individual addresses and which are subordinate to said central unit, and at least one bus line or data bus, which connects all of said stations whereby time slots are allotted or taken away from the stations through functional operation of said central unit in a predetermined manner and data transmission transpires in different phases subject to empolyment of normal request techniques; the improvement therewith wherein said central unit comprises:
   a bus phase control unit;
   a bus phase synchronizer unit which is connected to said bus phase control unit;
   a time slot request collector unit which is connected to said bus phase control unit;
   a time slot allocator unit which is connected to said bus phase control unit; and
   a register, which is connected to said time slot allocator unit and is adapted in particular to receive a list of said stations that request allocation of a time slot for data transmission.

5. An arrangement according to claim 4, in which each of said stations includes:
   a transmitter/receiver;
   an address recognition unit and address generator which are connected with said transmitter/receiver;
   a receiver buffer connected to said address recognition unit;
   a transmitter buffer;
   a synchronizer; and
   within at least one of said stations, a request generator disposed between said transmitter buffer and said synchoronizer in such a way that said request generator emits an appropriate signal when bus access is needed.

6. An arrangement according to claim 4, wherein an additional equivalent bus system is provided therewith which is operated in parallel with said serial data bus system via said central unit and which takes over functions of said serial data bus system when the latter fails.

* * * * *